Patented Nov. 7, 1939

2,179,174

UNITED STATES PATENT OFFICE 2,179,174

SULPHONATES OF MINERAL OIL EXTRACTS AND METHOD OF MAKING

Robert L. Brandt, New York, N. Y., assignor to Colgate-Palmolive-Peet Company, Jersey City, N. J., a corporation of Delaware No Drawing. Application June 4, 1938, Serial No. 211,946

14 Claims. (Cl. 260—504)

This invention relates to certain improved chemical compositions and to a method of their preparation, purification, and use. The improved compositions may be generally described as products or the salts of products of the specially controlled action of sulphonating agents upon certain portions of mineral oils. The products are particularly useful as deterging, wetting, foaming, frothing or emulsifying agents and, in general, as modifiers of capillary action and of surface tension. They are highly useful as textile assistants, as flotation agents, as household detergents, as industrial emulsifying agents and for many other purposes.

In many instances and in many ways, prior to this invention, mineral oils and sulphuric acid have been placed in contact and have to a greater or less extent been reacted together, but insofar as the present inventor has been able to determine, none of these products made according to the prior art has been satisfactory for household and general industrial use as a deterging, wetting, emulsifying, or foaming agent or the like.

According to Patents 2,149,661 and 2,149,662 issued March 7, 1939, on copending applications of this same inventor, namely, Serial No. 117,096, filed December 21, 1936 and Serial No. 138,463, filed April 22, 1937, methods are provided by which sulphuric acid-mineral oil reaction products of relatively high purity and effectiveness for the purposes mentioned, may be produced. Certain improvements in the processes of these applications described above have now been discovered, and these improvements comprise the present invention.

Ordinarily, when the materials extracted from petroleum oils are treated with sulphuric acid, polymerization, oxidation, sulphonation and sulphation, condensation and other types of reactions occur in greater or less degree, depending on the strength of acid, kind of oil, temperature, time, oil-acid volume relations, intimacy of contact and degrees of mutual solubility, and other factors. With all of these reactions taking place and all of these conditions to be controlled, it is not surprising that difficulty has been encountered in preventing the formation of unwanted compounds which give the final material both odor and color and detract greatly from its efficiency.

The sulphonated products prepared by the processes used prior to those described in the applicant's copending applications were dark in color, of bad odor and of poor quality, and unsatisfactory for most uses. In addition to these difficulties, the ordinary sulphonates of mineral oils, even though they appear, when dissolved in water, to give clear solutions, may contain relatively large quantities of unreacted oil. In addition to oil the products are apt to contain undesirable side reaction products such as resins, polymerized hydrocarbons, coloring matter, oil-soluble sulphonic acids, thio compounds and other materials that may be dark colored and/or malodorous and unstable.

Many of these undesirable side reaction products are highly objectionable in the finished products, as they prevent or hinder detersive action, rapid wetting-out and rapid solubility. In addition, they are the cause of stickiness in hand washing and of a slight yellow stain or color in washed goods.

By the process of this invention, it has been found that despite the numerous reactions that may occur when the process is not under easy control and the general complexity of the chemistry involved, a vastly superior material from a consideration of odor, color, deterging efficiency, emulsifying properties and the like can be produced by employing such control.

According to this invention, it is possible to bring about the desired sulphonation reaction with a minimum of side reactions by contacting the sulphonating agent and extracted material rapidly without permitting local overheating or a rise in temperature above certain limits, to continue the reaction no longer than about 15 minutes and preferably for a period no greater than 5 minutes, and then to get the products out of contact with the strong mineral acid immediately. If the reaction is conducted for a period of time appreciably longer than 15 minutes, the products are perceptibly darker in color, more odorous, and not as good detergents or wetting out agents as those prepared with a shorter reaction period.

In the process of this, as well as in my prior invention, rapidity of contact and low operating temperature are permitted by the use of liquid sulphur dioxide as a solvent for the reactants, and this same liquid sulphur dioxide appears to assist the reaction in still another way, which is not completely understood, but it may be considered that a catalytic effect of the liquid sulphur dioxide on the reaction between the extracted material and the sulphonating agent is to prevent side reactions while facilitating the desirable reaction. One embodiment of the present invention which particularly lends itself to the rapid sulphonation of the mineral oil extract is the admixture of the sulphonating agent, such as fuming sulphuric acid, with liquid sulphur dioxide before treatment of the mineral oil extract solution with said sulphonating agent.

As a starting material, in either the present process or those of the aforementioned applications, it is to be understood that any mineral oil or raw distillate therefrom may be used, but it is preferred to employ a distillate from what is generally known as a naphthene base crude, such as a Texas Gulf Coast crude, as distinguished from, say, a Pennsylvania crude. It has been found that the lower viscosity raw distillates are, in general, to be desired.

The first step in the processes of the applicant's patents noted above and usually in the present process is an extraction of the mineral oil or distillate to be used, with a selective solvent such as liquid sulphur dioxide, liquid sulphur dioxide plus benzol, furfural, phenol, nitrobenzene, dichloroethyl ether, a propane-cresylic acid mixture, or the like. This operation yields a hydrocarbon oil extract which is characterized by high specific gravity in comparison with the starting oil, extremely low viscosity index, high Conradson carbon, and a high degree of unsaturation. It is generally thought that the extracts so obtained are composed of the more aromatic and unsaturated of the hydrocarbons constituting the original oil. In general, repeated extractions of the same oil will yield additional extract, but the extract so obtained is not quite so satisfactory for the present purposes as the extracts obtained by less exhaustive extraction, and it has been found that the extracted hydrocarbon material most desirable for the present process is that which is readily soluble in liquid sulphur dioxide at low temperatures, as for instance, at 0° C. or even lower.

The hydrocarbon oil extract obtained by the above processes may be used directly for sulphonation. It has further been found, however, that considerable improvement in the final products can be effected by additional processing of the material to be sulphonated, which processing preferably takes place after solvent extraction but may be accomplished either before or after the extraction and/or by carrying out the extraction under particular conditions.

The further processing mentioned may comprise further narrowing of the boiling range of the portion of the oil to be sulphonated, by additional fractionation of the material after solvent extraction or by additional or more specific fractionation prior to extraction. It may also comprise treatment of the material to be used for sulphonation, with caustic soda to remove certain undesirable acidic constituents, treatment with sulphuric acid to remove asphalt-like and highly reactive bodies and water, and treatment with contact clay to assist in the sludge removal.

Probably the most important factor determining the quality and quantity of the extract obtained in the solvent extraction process is the operating temperature. In general, the lower the temperature the more selective are the solvents. For extracting light lubricating oils with liquid sulphur dioxide, a temperature between −15 and +15° C. is quite satisfactory. For lower viscosity oils even lower temperatures are advantageously employed, and when solvent extracting the lower boiling hydrocarbons such as crude naphtha, very low temperatures are of advantage (−60° F.).

A combination of all of the treatments mentioned is preferably employed and the yield, deterging, wetting, emulsifying efficiency, odor and color of the products have been found to be materially improved thereby. Any one of the steps, however, is of importance and contributes toward a better product and may or may not be used with the more general method of directly sulphonating the mineral oil extract in liquid sulphur dioxide to produce materially improved products.

The next step after the pre-treatment of the hydrocarbon extract consists in dissolving it in liquid sulphur dioxide, or the extract material being already in sulphur dioxide solution from the solvent extraction process, the next step may consist in diluting the solution with as much more sulphur dioxide as may be necessary to prepare it for the subsequent steps in the process. Usually, the extracted material should be dissolved in approximately one-half to two times its volume of liquid sulphur dioxide. The resulting solution of extracted material in liquid sulphur dioxide is, even at low temperatures (below 0° C.) very fluid and non-viscous.

Having the desired solution of extracted material in liquid sulphur dioxide, the solution is cooled to a temperature of about −15° to −20° C., and mixed with a sulphonating agent such as strong fuming sulphuric acid also preferably dissolved in liquid sulphur dioxide and at −15° to −20° C. The temperature is kept below +5° C., during the initial mixing and preferably below −5° C. Agitation should be applied when using a batch method in order to rapidly dissipate the heat generated to the cooling surfaces of the reaction vessel.

The quantity of acid used, and its strength, will depend on the type of extracted material, the reaction temperature, liquid sulphur dioxide dilution, and the characteristics desired in the finished product. Fuming sulphuric acid (commercial 20% oleum), in a quantity about equal in weight to the extracted material to be treated and dissolved in liquid sulphur dioxide, has been found satisfactory. Sulphur trioxide, chlorsulphonic acid or other sulphonating agent soluble in liquid sulphur dioxide may also be used. By dissolving the sulphonating agent in liquid sulphur dioxide, it is possible to add this agent to the liquid sulphur dioxide solution of the mineral oil extract over a much shorter period of time without excessive temperature increase such as would result if the sulphonating agent were added directly to the mineral oil extract solution. Furthermore, it permits extremely rapid reaction rates and physically permits more rapid dissipation and removal of the heat of reaction. The reaction is carried out at low temperatures which prevent or minimize oxidation, polymerization and other undesired reactions that always occur at the usual sulphonation temperatures. Upon completion of the original mixing of acid with the extracted materials and after the initial evolution of heat of reaction has been dissipated, the reacting mixture is raised to a temperature of about +5° C. by control of cooling apparatus. The original mixing is accomplished in a few minutes. The reaction is permitted to continue with agitation for a period not greater than fifteen minutes from the initial mixing of the reactants and preferably no longer than five minutes.

Treatment with the sulphonating agent having been completed, the reaction mixture is diluted with cold water to stop further action of the sulphonating agent. After water dilution the next step is to separate any unreacted mineral hydrocarbon from the mixture. Several alternatives are possible. One is to hold the liquid sulphur dioxide solution of sulphonation products and acid under pressure and add enough water to form two layers. One layer, consisting of the bulk of liquid sulphur dioxide containing most of the unreacted hydrocarbon oil in solution, may be directly separated. The second layer, consisting of the sulphonic-sulphuric acids in aqueous solution, may be further extracted with fresh liquid sulphur dioxide, and after removal of the residual dissolved sulphur dioxide, the aqueous layer may then be neutralized with a basic compound such as caustic soda, soda ash, ammonia, lime, triethanolamine, or the like.

Alternatively, the liquid sulphur dioxide solvent may be evaporated off immediately on dilution of the reaction mixture with water, and the quantity of water may be controlled to give either a dilute solution of sulphonic-sulphuric acids (one phase), or, with a lesser proportion of water, such a concentration of sulphuric acid that a two-phase system results, consisting of an upper layer of sulphonic acids and a lower layer of diluted sulphuric acid. The latter may be withdrawn directly and discarded. In this manner a substantially sulphuric acid free sulphonic acid solution is obtained. This layer may be washed with an insoluble low boiling hydrocarbon in order to free it from any unreacted extract that it may contain. Ordinarily it is best to dilute this layer with water before extraction with the solvent.

It has been discovered that if the washing is performed after dilution with water but before neutralization, certain difficulties due to the formation of emulsions are avoided and for that reason, the step is best performed at that time.

The water solution of the reaction product may or may not be boiled before neutralization to destroy any unstable sulphates present. After neutralization, the solution may be boiled in an excess of caustic soda, or the acid solution may be run into a calculated amount of hot concentrated caustic soda to decompose unstable compounds. The solution of neutralized sulphuric acid reaction product, which may also contain a considerable proportion of the sulphate of the neutralizing material as a result of its reaction with the excess sulphuric acid present may be used in this state for many purposes, or it may be further concentrated by extracting with isopropyl, butyl or with substantially water-insoluble alcohols in which the active ingredient is soluble, to free it from the by-product sulphate formed in the neutralizing process.

The final material, either with or without the by-product sulphate, may be formed into beads, flakes, chips, powders, solutions, liquid or plastic emulsions or other forms into which soap or other detergent or emulsifying materials are ordinarily made, either with or without the ingredients commonly used in such combinations, for example active or inert soap fillers, water softeners, perfumes, abrasives, soap and other detergents, fats, oils, waxes, and glycerine. The sulphonate product can be incorporated with the usual fatty acid soaps and the composition formed into bars, flakes or powders. The last combination yields an inexpensive detergent composition possessing all the desirable properties of the ordinary soaps and the additional advantages of operativeness in hard and sea water and of increased wetting, emulsifying and deterging efficiency.

A more detailed understanding of the principles of this invention may be achieved by a consideration of the following specific examples of the process of making the improved compositions.

*Example I*

The extracted material used was obtained by the Edeleanu process from a Texas Gulf Coast crude distillate of the naphthene base type, having a Saybolt viscosity at 100° F. of about 100 seconds. One volume of the extracted material was mixed with half its volume of liquid sulphur dioxide and cooled to —15° C. A quantity of 20% commercial oleum equal in weight to the extracted material and dissolved in a volume of liquid sulphur dioxide equal to that used to dissolve the extract, was added to the solution with agitation, the addition being made in about one minute. The operation was performed in a jacketed autoclave, provided with a stirring device, thermometer and pressure gauge. Considerable evolution of heat occurred during and immediately after the addition of the acid. Temperature control was maintained by circulating a cooling fluid through the jacket and the temperature was at no time permitted to rise above —5° C. during the mixing. After the acid addition, the temperature was raised to +5° C. and maintained at that point for about three minutes, the agitation being continued. At the end of this period the material was immediately mixed with twice its volume of ice-water.

During dilution with water the liquid sulphur dioxide was removed by evaporation and the aqueous layer was heated to 45° C. to remove any residual sulphur dioxide. The aqueous solution was then batch-washed several times with 20% of its volume of gasoline, (end boiling point below 250° F.). The aqueous solution of sulphuric-sulphonic acids mixture was neutralized by pouring into a calculated quantity of very strong caustic soda and brought to a boil. The neutralized solution was then taken to dryness on the soap-drying rolls at a roll temperature of about 250° F.

The above operations yielded a substantially dry powder almost white in color, having no odor in the dry state. Aqueous solutions, when rubbed into a lather on the hands, give no odor. Dilute solutions of varying concentration were excellent foamers (comparing favorably with soap), excellent washing and detergent materials, and also powerful wetting-out and emulsifying agents.

*Example II*

According to the preferred process, a distillate from a Texas Gulf Coast crude boiling between 130° C. and 350° C. at 5 mm. pressure and having a Saybolt viscosity of 80 seconds at 100° F., was countercurrently extracted with approximately an equal volume of liquid sulphur dioxide by the usual Edeleanu process, the sulphur dioxide separated from the extract and the extract then fractionally distilled, in vacuum, in the presence of about 0.1% of its weight of caustic soda. The fraction boiling between 220° C. and 240° C. at 5 mm. pressure was pretreated with about 1% of its weight of 92% sulphuric acid by mixing it therewith for about forty-five minutes. Most of the acid-sludge settled out at once, but a remainder, which is known as "pepper" sludge, had a tendency to remain suspended in the oil and was removed by treating the oil with about 0.2% of its weight of contact clay and heating to 130 to 150° C. excluding air. After hot filtration, the oil was found bright and clear. Centrifuging may be employed instead of, or in addition to, the contact clay treatment.

The desired fractions of the extract may be individually or collectively sulphonated. The pre-treated extract was dissolved in an equal volume of liquid sulphur dioxide and cooled to —20° C. Over a period of one minute a liquid sulphur dioxide solution of 20% oleum was added. The quantity of oleum used was equal in weight to that of the hydrocarbon material to be sulphonated and was dissolved in half its volume of liquid sulphur dioxide and cooled to —20° C. The reaction mixture was agitated in a jacketed autoclave provided with stirrer, pressure gauge and thermometer and cooling means. Considerable heat was evolved upon the addition of acid. Temperature control was maintained by circulating a cooling fluid through the jacket. The temperature during mixing was not permitted to rise above +5° C., and was maintained at that point for about ten minutes, the agitation being continued. At the end of this period, ice-water was added and the sulphur dioxide was separated as a vapor, by releasing the pressure at a temperature below +10° C.

The aqueous solution or dispersion was immediately batch-washed several times with 20% of its volume of gasoline, endpoint 250° F. It was neutralized with caustic soda, and finally dried on soap-drying rolls at a roll temperature of 250° F.

The above operation yielded a substantially dry powder even better in color than the products described in Example I and likewise having practically no odor either in the dry state or when rubbed to a lather on the hands.

Many uses for the new products will become immediately apparent. To mention but a few possibilities, they are useful in the flotation of ores, in shampoos, in dye baths, and for many detergent purposes. They may be used either alone or in admixture with soaps and/or soap fillers, such as sodium silicate, sodium carbonate, bentonite, calcium carbonate, talc and pumice. The final products may take the form of powders, beads, bars, solutions, emulsions, creams, or salves, or any other forms desired.

In this specification, the term sulphonation has been used in its broad sense to mean the reaction of sulphuric acid upon the oil products and not merely the formation of one class of chemical compounds. Furthermore, the details of the process, such as the quantities of the reagents, their concentrations and temperatures for the reactions are but examples of satisfactory constants for a particular type of oil. As the type of oil is varied, as it may be within the scope of this invention, these various factors will necessarily vary, but the application of the general principles set forth herein, and the varying of these factors in accordance with the needs of the particular situation are within the concept of this invention.

Where I have hereinbefore disclosed gasoline for the purification of the aqueous solution of the reaction products, I may employ in its place aromatic and aliphatic chlorinated solvents such as dichloroethylene, ethylene dichloride, propylene dichloride, dichlor ethyl ether, ether, monochlorbenzene, carbon tetrachloride and other suitable solvents.

The products made according to this invention are of the type described and claimed in the copending application of this inventor, Serial No. 117,096, filed December 21, 1936; now matured into Patent 2,149,661. They are somewhat improved over the products described in the examples of that patent for by virtue of the short reaction time the initially sulphonated hydrocarbons are removed from the sphere of reaction with the oleum almost as soon as they are formed and therefore side reactions are to this extent reduced and so polymerization, oxidation and oversulphonation prevented.

The process hereinbefore disclosed as a batch method may be carried out continuously or intermittently in suitably arranged apparatus.

I claim:

1. The process of preparing sulphonic acids which comprises treating a hydrocarbon material removed from a mineral oil by solvent extraction with a preferential solvent that tends to dissolve certain constituents of the oil and not to dissolve others, the constituents which the solvent tends to dissolve being generally those of an unsaturated nature including those of an aromatic nature, with a sulphonating agent while in solution in liquid sulphur dioxide for a period not exceeding fifteen minutes.

2. A process of preparing sulphonic acids from mineral oil which comprises treating a mixture of liquid sulphur dioxide and the material removed from a mineral oil by solvent extraction with a preferential solvent that tends to dissolve certain constituents of the oil and not to dissolve others, the constituents which the solvent tends to dissolve being generally those of an unsaturated nature, including those of an aromatic nature, with liquid sulphur dioxide having dissolved therein a sulphonating agent for a period not exceeding fifteen minutes.

3. A process of preparing sulphonates that comprises solvent extracting mineral oil with a preferential solvent that tends to dissolve certain constituents of the oil and not to dissolve others, the constituents which the solvent tends to dissolve being generally those of an unsaturated nature including those of an aromatic nature, separating the extract and raffinate, treating the extracted material while dissolved in liquid sulphur dioxide with a solution of a sulphonating agent dissolved in liquid sulphur dioxide for a period not exceeding fifteen minutes, removing the sulphur dioxide, and thereafter washing the product with a low end point saturated hydrocarbon and neutralizing.

4. A process of preparing sulphonic acids that comprises treating a material removed from a mineral oil by solvent extraction with a preferential solvent that tends to dissolve certain constituents of the oil and not to dissolve others, the constituents which the solvent tends to dissolve being generally those of an unsaturated nature including those of an aromatic nature, with a sulphonating agent while the extract is dissolved in liquid sulphur dioxide for a period not exceeding five minutes.

5. A process of preparing sulphonic acids from mineral oil that comprises treating liquid sulphur dioxide solution of the material removed from a mineral oil by solvent extraction with a preferential solvent that tends to dissolve certain constituents of the oil and not to dissolve others, the constituents which the solvent tends to dissolve being generally those of an unsaturated nature, including those of an aromatic nature, with a mixture of liquid sulphur dioxide and a sulphonating agent for a period not exceeding five minutes.

6. A process of preparing sulphonic acids that comprises solvent extracting mineral oil with a preferential solvent that tends to dissolve certain constituents of the oil and not to dissolve others, the constituents which the solvent tends to dissolve being generally those of an unsaturated nature, separating the extract and raffinate, and treating for a period not exceeding five minutes, one part by volume of the extracted material while dissolved in liquid sulphur dioxide with approximately one part by volume of fuming sulphuric acid which has been mixed with liquid sulphur dioxide before adding to the extract.

7. A process of preparing sulphonates that comprises solvent extracting mineral oil with a preferential solvent that tends to dissolve certain constituents of the oil and not to dissolve others, the constituents which the solvent tends to dissolve being generally those of an unsaturated nature, including those of an aromatic nature, separating the extract and raffinate, treating the extracted material while dissolved in liquid sulphur dioxide with a mixture of a sulphonating agent and liquid sulphur dioxide for a period not exceeding five minutes, removing the sulphur dioxide, and thereafter washing the product with a low end point saturated hydrocarbon and neutralizing.

8. A process of preparing sulphonic acids that comprises solvent extracting a material of the group consisting of mineral oil and mineral oil distillates with a preferential solvent that tends to dissolve certain constituents of the oil and not to dissolve others, the constituents which the solvent tends to dissolve being generally those of an unsaturated nature, including those of an aromatic nature, fractionally distilling the extracted material in vacuum over caustic soda, discarding fractions at least at one end of the boiling range, treating the remaining fractions with a small proportion of sulphuric acid to remove asphaltlike and highly reactive bodies and water therefrom, separating the sludge formed, dissolving the resultant material in a substantial proportion of liquid sulphur dioxide and treating the solution with a sulphonating agent for a period not exceeding five minutes.

9. A process of preparing sulphonic acids that comprises solvent extracting mineral oil with a preferential solvent that tends to dissolve certain constituents of the oil and not to dissolve others, the constituents which the solvent tends to dissolve being generally those of an unsaturated nature, including those of an aromatic nature, dissolving the extract in liquid sulphur dioxide, cooling the solution to about $-15°$ C. and quickly mixing therewith a mixture of liquid sulphur dioxide and a sulphonating agent while maintaining the temperature during mixing below about $-5°$ C., and after mixing below about $+5°$ C., the entire time of treatment with the sulphonating agent being not greater than five minutes.

10. The product prepared according to the process of claim 1.

11. The product prepared according to the process of claim 3.

12. The product prepared according to the process of claim 4.

13. The product prepared according to the process of claim 7.

14. The product prepared according to the process of claim 8.

ROBERT L. BRANDT.